(12) United States Patent
Kato et al.

(10) Patent No.: US 11,334,160 B2
(45) Date of Patent: May 17, 2022

(54) SIGNAL PROCESSING DEVICE, SIGNAL PROCESSING METHOD, AND ELECTRONIC DEVICE

(71) Applicant: SONY CORPORATION, Tokyo (JP)

(72) Inventors: Ayumi Kato, Kanagawa (JP); Osamu Ito, Tokyo (JP)

(73) Assignee: SONY CORPORATION, Tokyo (JP)

(*) Notice: Subject to any disclaimer, the term of this patent is extended or adjusted under 35 U.S.C. 154(b) by 582 days.

(21) Appl. No.: 16/325,062

(22) PCT Filed: Aug. 17, 2017

(86) PCT No.: PCT/JP2017/029490
§ 371 (c)(1),
(2) Date: Feb. 12, 2019

(87) PCT Pub. No.: WO2018/043136
PCT Pub. Date: Mar. 8, 2018

(65) Prior Publication Data
US 2021/0278902 A1 Sep. 9, 2021

(30) Foreign Application Priority Data
Aug. 31, 2016 (JP) .............................. JP2016-169337

(51) Int. Cl.
*G06F 3/01* (2006.01)
*G06F 3/04847* (2022.01)
(Continued)

(52) U.S. Cl.
CPC ............ *G06F 3/016* (2013.01); *G06F 3/0485* (2013.01); *G06F 3/0488* (2013.01); *G06F 3/04847* (2013.01)

(58) Field of Classification Search
None
See application file for complete search history.

(56) References Cited

U.S. PATENT DOCUMENTS 9,110,562 B1\* 8/2015 Eldawy .............. H04N 21/8456
9,411,422 B1\* 8/2016 McClendon .......... G06F 3/0488
(Continued)

FOREIGN PATENT DOCUMENTS

CN 101568894 A 10/2009
CN 104685447 A 6/2015
(Continued)

OTHER PUBLICATIONS

International Search Report and Written Opinion of PCT Application No. PCT/JP2017/029490, dated Sep. 19, 2017, 06 pages of ISRWO.
(Continued)

*Primary Examiner* — Stella Higgs
(74) *Attorney, Agent, or Firm* — Chip Law Group

(57) ABSTRACT

The present disclosure relates to a signal processing device, a signal processing method, and an electronic device that are capable of providing user interface having better operability. The signal processing device includes an input information acquisition unit that acquires input information input through a touch operation by a user, and a feedback control unit that outputs mutually different kinds of feedback control in accordance with a kind of the input information continuously acquired in response to movement of a position touched through the touch operation. In addition, the signal processing device further includes an operation speed calculation unit that calculates an operation speed at which a touched position through the touch operation moves, and the feedback control unit changes the output of feedback control in accordance with the operation speed. The present technology is applicable to, for example, an electronic device including a touch panel.

12 Claims, 12 Drawing Sheets

(51) Int. Cl.
*G06F 3/0485* (2022.01)
*G06F 3/0488* (2022.01)

(56) References Cited

U.S. PATENT DOCUMENTS

| | | | | |
|---|---|---|---|---|
| 9,678,571 | B1* | 6/2017 | Robert | G06F 3/04883 |
| 9,984,539 | B2* | 5/2018 | Moussette | G06F 3/16 |
| 2009/0262090 | A1 | 10/2009 | Oh | |
| 2012/0266066 | A1 | 10/2012 | Liao et al. | |
| 2013/0191747 | A1* | 7/2013 | Choi | G06F 3/048 715/716 |
| 2013/0322848 | A1* | 12/2013 | Li | H04N 5/783 386/241 |
| 2015/0277564 | A1* | 10/2015 | Saito | G06F 3/0485 715/702 |
| 2016/0110046 | A1* | 4/2016 | Yao | G06F 3/0488 715/784 |
| 2016/0209979 | A1* | 7/2016 | Endo | G06F 3/016 |
| 2016/0349847 | A1* | 12/2016 | Sugiura | G06F 3/044 |
| 2017/0168773 | A1* | 6/2017 | Keller | G06F 3/011 |

FOREIGN PATENT DOCUMENTS

| | | |
|---|---|---|
| CN | 104898825 A | 9/2015 |
| CN | 104978062 A | 10/2015 |
| CN | 105206180 A | 12/2015 |
| CN | 105579930 A | 5/2016 |
| EP | 2124131 A2 | 11/2009 |
| JP | 2014-112314 A | 6/2014 |
| JP | 2015-197822 A | 11/2015 |
| KR | 10-2015-0114438 A | 10/2015 |
| WO | 2014/002490 A1 | 1/2014 |
| WO | 2015/121958 A1 | 8/2015 |

OTHER PUBLICATIONS

Extended European Search Report of EP Application No. 17846144.8, dated Nov. 23, 2020, 11 pages.

Office Action for CN Patent Application No. 201780051470.2, dated Sep. 1, 2021, 14 pages of English Translation and 10 pages of Office Action.

* cited by examiner

SIGNAL PROCESSING DEVICE, SIGNAL PROCESSING METHOD, AND ELECTRONIC DEVICE

CROSS REFERENCE TO RELATED APPLICATIONS

This application is a U.S. National Phase of International Patent Application No. PCT/JP2017/029490 filed on Aug. 17, 2017, which claims priority benefit of Japanese Patent Application No. JP 2016-169337 filed in the Japan Patent Office on Aug. 31, 2016. Each of the above-referenced applications is hereby incorporated herein by reference in its entirety.

TECHNICAL FIELD

The present disclosure relates to a signal processing device, a signal processing method, a program, and an electronic device, and particularly relates to a signal processing device, a signal processing method, a program, and an electronic device that are capable of providing a user interface having better operability.

BACKGROUND ART

In recent years, an electronic device such as a so-called smartphone includes a touch panel capable of detecting a touch by a user's finger or the like, and the user can perform various touch operations by using a user interface displayed on the touch panel. For example, the user performs, on a slider of a seek bar used for moving a page displayed in an electronic book, an operation of moving a finger while touching the touch panel, thereby sequentially displaying pages in a turning manner.

In addition, conventionally, various measures to enhance operability have been performed on such a user interface using a touch panel.

For example, Patent Document 1 discloses an input device configured to detect a pressing force of a push operation on a touch panel, and shift the selection state of an input candidate in accordance with increase or decrease of the pressing force.

CITATION LIST

Patent Document

Patent Document 1: Japanese Patent Application Laid-open No. 2011-59821

SUMMARY OF THE INVENTION

Problems to be Solved by the Invention

A conventional user interface using a touch panel is configured to cause an operation result of a touch operation to be mainly recognized by a user's vision. For this reason, it has been difficult for the user to recognize input information during an operation such as the operation of moving a slider or the operation of scrolling a display screen. Accordingly, a user interface having better operability has been required, which makes it easier for the user to recognize input information during such an operation.

The present disclosure is made in view of such a situation, and is intended to provide a user interface having better operability.

Solutions to Problems

A signal processing device according to one aspect of the present disclosure includes: an input information acquisition unit configured to acquire input information input through a touch operation by a user; and a feedback control unit configured to output mutually different kinds of feedback control in accordance with a kind of the input information continuously acquired in response to movement of a position touched through the touch operation.

A signal processing method or a program according to another aspect of the present disclosure includes steps of: acquiring input information input through a touch operation by a user; and outputting mutually different kinds of feedback control in accordance with a kind of the input information continuously acquired in response to movement of a position touched through the touch operation.

An electronic device according to another aspect of the present disclosure includes: a touch panel configured to display a user interface for receiving a touch operation by a user, detect a position touched through the touch operation, and vibrate in accordance with signal processing based on the touch operation; and a signal processing device configured to perform signal processing in accordance with the touch operation on the touch panel by the user. The signal processing device includes an input information acquisition unit configured to acquire input information input through the touch operation, and a feedback control unit configured to output feedback control to the touch panel so that vibrations different from each other are performed in accordance with a kind of the input information continuously acquired in response to movement of a position touched through the touch operation.

In an aspect of the present disclosure, input information input through a touch operation by a user is acquired, and mutually different kinds of feedback control are output in accordance with the kind of the input information continuously acquired in response to movement of a position touched through the touch operation.

Effects of the Invention

According to an aspect of the present disclosure, it is possible to provide a user interface having better operability.

MODE FOR CARRYING OUT THE INVENTION

Hereinafter, specific embodiments to which the present technology is applied will be described in detail with reference to the accompanying drawings.

<Exemplary Configuration of Electronic Device>

Figure 1:
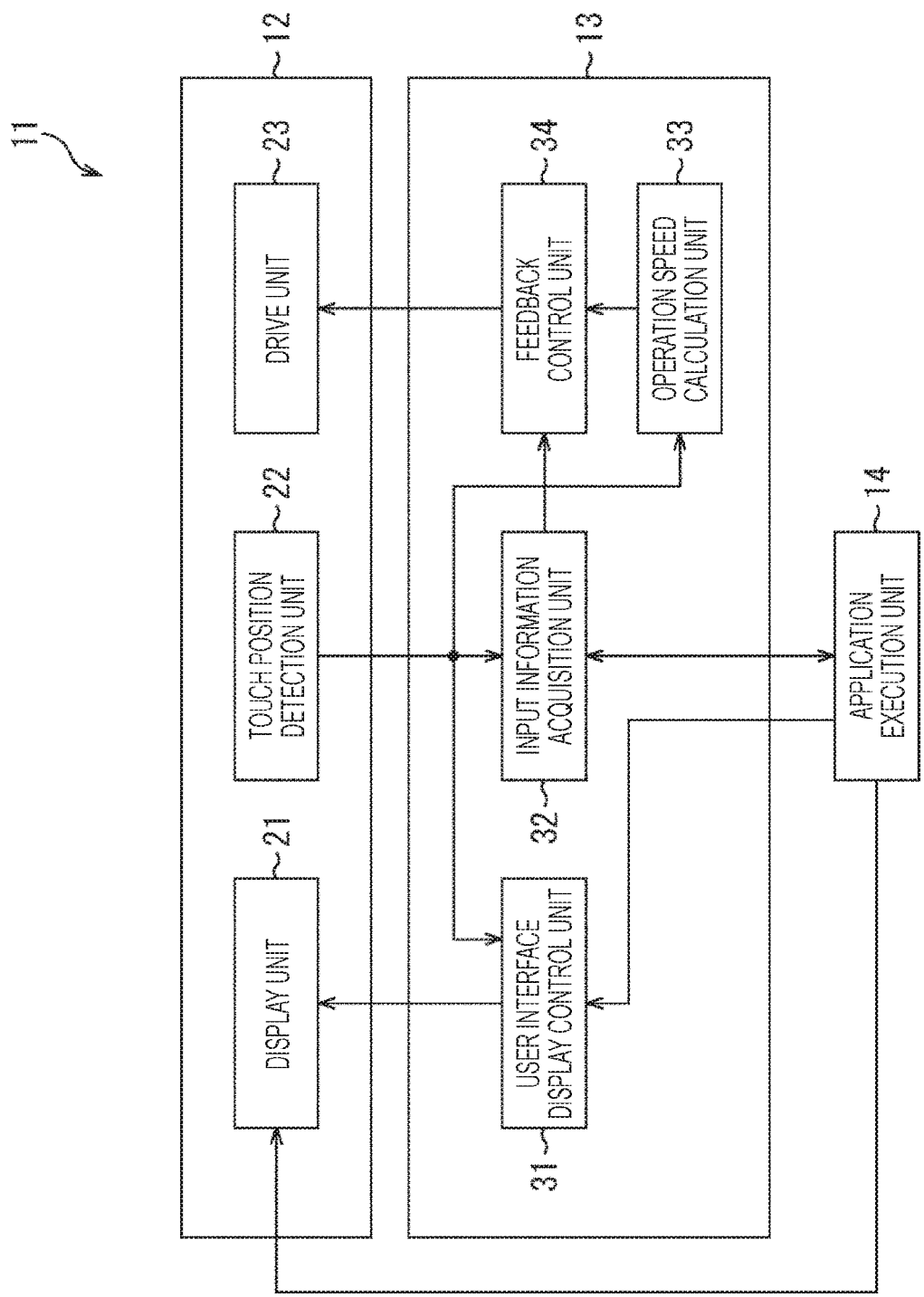
FIG. 1 is a block diagram illustrating an exemplary configuration of an embodiment of an electronic device to which the present technology is applied.

FIG. 1 is a block diagram illustrating an exemplary configuration of an embodiment of an electronic device to which the present technology is applied.

As illustrated in FIG. 1, an electronic device 11 includes a touch panel 12, a touch signal processing unit 13, and an application execution unit 14. For example, the electronic device 11 is an information processing terminal such as a so-called smartphone. A touch operation is performed on the touch panel 12 by a user, and a display screen in accordance with an application executed by the application execution unit 14 is displayed on the touch panel 12.

The touch panel 12 includes a display unit 21, a touch position detection unit 22, and a drive unit 23.

The display unit 21 displays a display screen in accordance with an application executed by the application execution unit 14, a user interface (such as a seek bar 42 illustrated in FIGS. 2A and 2B) configured to receive a touch operation on the touch panel 12 by the user, and the like.

When the user performs a touch operation on the surface of the touch panel 12 by a finger, a stylus, or the like, the touch position detection unit 22 detects a position touched by the user. Then, the touch position detection unit 22 supplies a touch position signal indicating the position touched by the user to the touch signal processing unit 13.

The drive unit 23 performs drive to vibrate the surface of the touch panel 12 in accordance with feedback control by the touch signal processing unit 13 based on a touch operation by the user.

The touch signal processing unit 13 includes a user interface display control unit 31, an input information acquisition unit 32, an operation speed calculation unit 33, and a feedback control unit 34. The touch signal processing unit 13 performs signal processing on a touch position signal supplied from the touch position detection unit 22 in accordance with a touch operation performed by the user on the touch panel 12.

The user interface display control unit 31 displays a user interface (for example, the seek bar 42 illustrated in FIGS. 2A and 2B) in accordance with an application executed by the application execution unit 14 on the display unit 21. In addition, the user interface display control unit 31 controls display of the user interface (for example, moves the display position of a slider 44 in FIGS. 2A and 2B) in accordance with a touch position signal supplied from the touch position detection unit 22.

The input information acquisition unit 32 acquires input information input to the electronic device 11 through a touch operation by the user in accordance with a touch position signal supplied from the touch position detection unit 22, and supplies the input information to the feedback control unit 34 and the application execution unit 14. For example, in a case where the application execution unit 14 executes an electronic book application, the input information acquisition unit 32 acquires the page number of an electronic book as input information in accordance with the touch position signal. In addition, in a case where the application execution unit 14 executes a moving image playback application, the input information acquisition unit 32 acquires the frame number, playback time, chapter, and the like of a moving image being played back as input information in accordance with the touch position signal.

The operation speed calculation unit 33 calculates, on the basis of a touch position signal supplied from the touch position detection unit 22, an operation speed at which a position touched through a touch operation by the user moves, and supplies the calculated operation speed to the feedback control unit 34.

The feedback control unit 34 outputs feedback control to the drive unit 23 in accordance with input information supplied from the input information acquisition unit 32, and, for example, vibrates the touch panel 12 as feedback to the user's tactile sense. In addition, the feedback control unit 34 changes the output of feedback control in accordance with the operation speed supplied from the operation speed calculation unit 33. Note that the feedback control by the feedback control unit 34 will be described in detail later with reference to FIGS. 2A, 2B, 3A, 3B, 3C, 4A, and 4B.

The application execution unit 14 executes, for example, an application installed on the electronic device 11 in advance, an application provided through a network, or the like, and displays a display screen in accordance with each application on the display unit 21. For example, the application execution unit 14 can execute an electronic book application that displays an electronic book, a moving image playback application that plays back a moving image, an image management application that manages an image, and the like.

The application execution unit 14 also instructs the user interface display control unit 31 to display a user interface in accordance with an application being executed. In addition, the application execution unit 14 controls a display screen displayed on the display unit 21 in accordance with input information supplied from the input information acquisition unit 32.

<Exemplary Feedback Control>

The feedback control in an electronic book application is described with reference to FIGS. 2A and 2B.

Figure 2A:
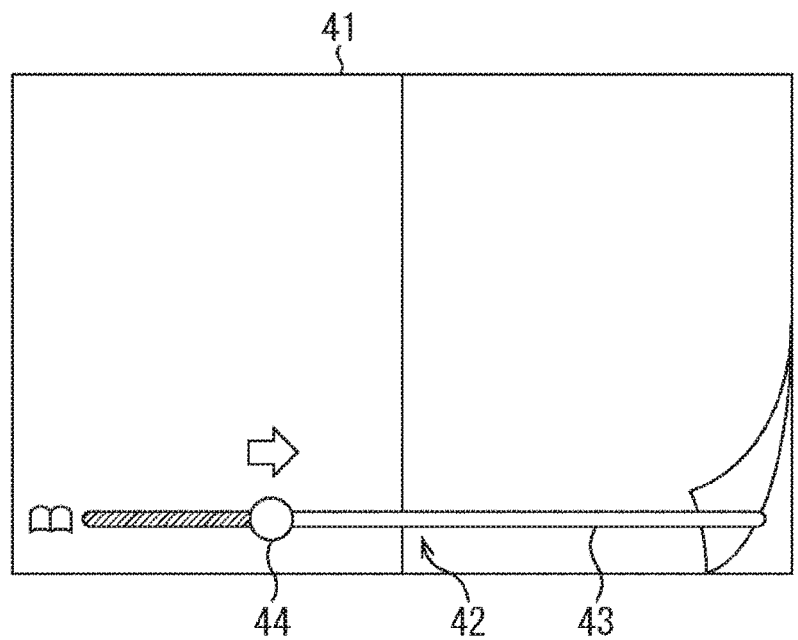
FIGS. 2A and 2B are diagrams for description of feedback control in an electronic book application.

FIG. 2A illustrates an exemplary display screen displayed on the display unit 21 while the electronic book application is executed by the application execution unit 14. FIG. 2B illustrates an exemplary feedback control performed in the electronic book application.

As illustrated in FIG. 2A, on an entire display screen 41 of an electronic book, for example, pages of the electronic book corresponding to page numbers as display targets are displayed in two-page spread. In addition, a seek bar 42, which is an exemplary user interface used for inputting a page number to be displayed on the display screen 41 of the electronic book, is displayed at the lower side of the display screen 41 of the electronic book.

The seek bar 42 includes a bar 43 indicating the number of pages of the entire electronic book, and the slider 44 indicating a position corresponding to the page number of a page displayed on the display screen 41 of the electronic book. For example, the user can input the page number of a page to be displayed on the display screen 41 of the electronic book by performing a touch operation to move the slider 44 in the left and right directions, and the input information acquisition unit 32 acquires the page number as input information.

For example, in the electronic device 11, when the user performs a touch operation to move the slider 44, feedback control is performed to cause the touch panel 12 to vibrate in accordance with the page number of the electronic book input during the operation. Accordingly, in the electronic device 11, feedback control is performed to vibrate the touch panel 12 in accordance with the page number of the electronic book corresponding to, not a position at which the user finally stops the slider 44, but each position through which the slider 44 being moved passes.

In this case, the feedback control unit 34 performs feedback control on the drive unit 23 so that the touch panel 12 vibrates differently in accordance with the type of page number acquired by the input information acquisition unit 32. Here, the type of page number is, for example, a normal page number appearing every page, or a specific page number appearing less frequently than at each page (for example, a page number in 10 pages, or a page number at each division such as a section or a chapter in accordance with the contents of the electronic book).

In addition, the feedback control unit 34 performs feedback control on the drive unit 23 so that the type of vibration (amplitude and frequency) generated on the touch panel 12 differs between normal and specific page numbers. For example, the feedback control unit 34 controls the drive unit 23 to drive, for a normal page number, the touch panel 12 with vibration A having a normal amplitude, and drives, for a specific page number, the touch panel 12 with a vibration B having a large amplitude so that the vibration is easier to perceive than vibration with the normal amplitude.

Figure 2B:
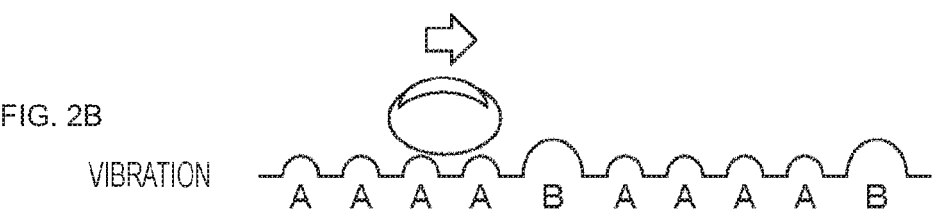

Specifically, as illustrated in FIG. 2B, in a case where the page number acquired by the input information acquisition unit 32 is a normal page number (a page number other than multiples of five in the example in FIG. 2B), the feedback control unit 34 performs feedback control to drive the drive unit 23 with vibration A. In a case where the page number acquired by the input information acquisition unit 32 is a specific page number (a page number equal to a multiple of five in the example in FIG. 2B), the feedback control unit 34 performs feedback control to drive the drive unit 23 with vibration B having an amplitude larger than that of vibration A. Accordingly, in a case where the page number of the electronic book input during a touch operation by the user to move the slider 44 is other than a multiple of five, the touch panel 12 vibrates with vibration A. In a case where the page number is a multiple of five, the touch panel 12 vibrates with vibration B.

Thus, the user can recognize the difference between normal and specific page numbers not only through visual recognition of the page number but also through the feeling of a fingertip performing the touch operation, for example. As a result, the user can more easily specify and display a desired page number than in conventional cases. In this manner, the electronic device 11 can provide a user interface having better operability.

In a case where the user performs a touch operation on the seek bar 42 at high speed, in other words, in a case where a finger touching the touch panel 12 moves fast, the interval of vibrations generated on the touch panel 12 decreases. Accordingly, in this case, the vibration is densely generated and perceived by the user's fingertip at a larger number of times per unit time, and as a result, the user obtains a feeling that continuously-connected vibrations are generated.

Accordingly, for example, it is assumed that it becomes difficult for the user to perceive vibration at each page.

To avoid this, the electronic device 11 can change the output of feedback control in accordance with the operation speed of the touch operation by the user.

Figure 3A:
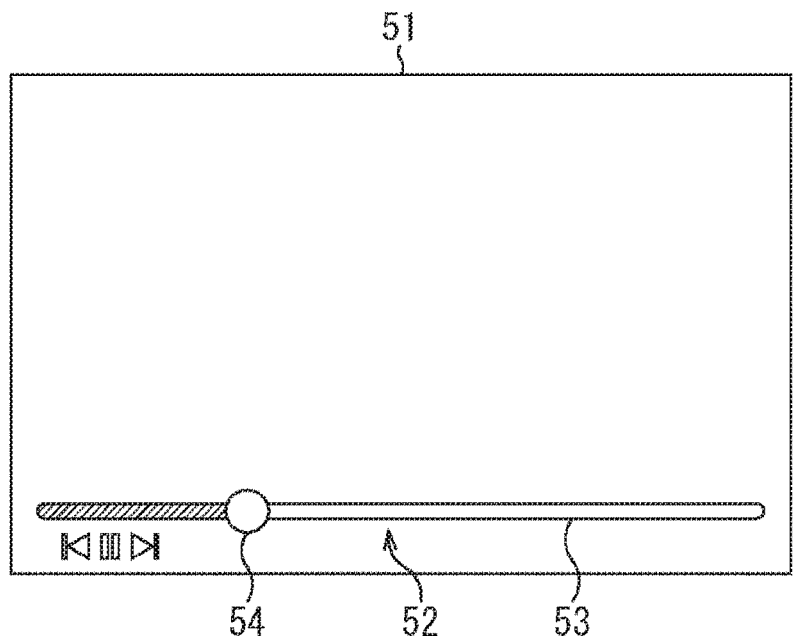
FIGS. 3A, 3B, and 3C are diagrams for description of a first mode in which the output of feedback control is changed in accordance with the operation speed.
Figure 3B:
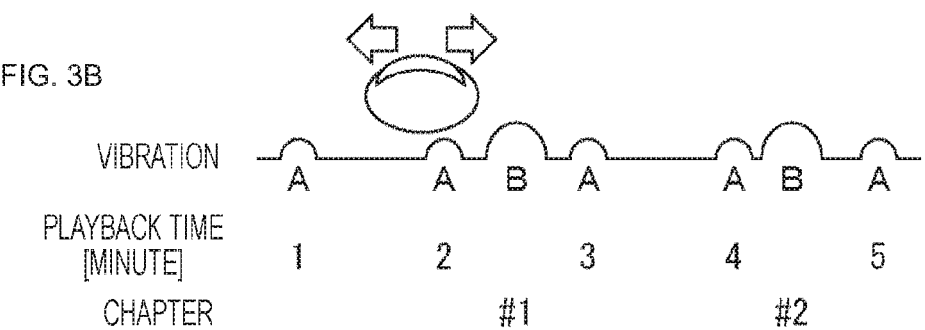
Figure 3C:
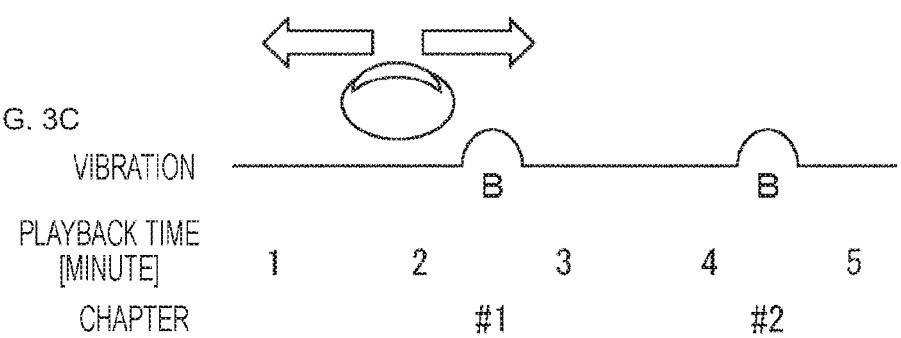

The following describes, with reference to FIGS. 3A, 3B, and 3C, a first mode in which the output of feedback control is changed in accordance with the operation speed of a touch operation performed by the user.

FIG. 3A illustrates an exemplary display screen displayed on the display unit 21 while the application execution unit 14 executes a moving image playback application. B and C of FIGS. 3B and 3C illustrate exemplary feedback control performed in the moving image playback application.

As illustrated in FIG. 3A, a moving image being played back is displayed entirely on a moving image display screen 51. In addition, a seek bar 52, which is an exemplary user interface used for inputting the playback time of a frame to be displayed on the moving image display screen 51, is displayed at the lower side of the moving image display screen 51.

The seek bar 52 includes a bar 53 indicating the playback time of the entire moving image, and a slider 54 representing a position corresponding to the playback time of a frame displayed on the moving image display screen 51. For example, the user can input the playback time of a frame to be displayed on the moving image display screen 51 by performing a touch operation to move the slider 54 in the left and right directions, and the input information acquisition unit 32 acquires the playback time [minutes] as input information.

In addition, in the electronic device 11, when the user performs a touch operation to move the slider 54, feedback control is performed to vibrate the touch panel 12 in accordance with the playback time of a frame input during the operation. In this case, the feedback control unit 34 performs feedback control on the drive unit 23 so that the touch panel 12 vibrates differently between, among playback times acquired by the input information acquisition unit 32, a playback time (normal input information) indicating an interval at which the moving image is divided on the basis of the playback time, and a playback time (specific input information) indicating an interval at which the moving image is divided in accordance with contents.

For example, the feedback control unit 34 controls the drive unit 23 to drive with vibration A having the normal amplitude at a playback time indicating the interval at which the moving image is divided on the basis of the playback time. However, the feedback control unit 34 controls the drive unit 23 to drive with vibration B, which has a large amplitude so that the vibration is easier to perceive than the vibration having the normal amplitude, at a playback time indicating the interval at which the moving image is divided in accordance with contents.

Specifically, as illustrated in FIG. 3B, in a case where the playback time acquired by the input information acquisition unit 32 is a playback time indicating the interval (one-minute interval in the example illustrated in FIGS. 3A, 3B, and 3C) at which the moving image is divided on the basis of the playback time, the feedback control unit 34 performs feedback control to drive the drive unit 23 with vibration A. On the other hand, in a case where the playback time acquired by the input information acquisition unit 32 is a playback time indicating the interval (chapter in the example illustrated in FIGS. 3A, 3B, and 3C) at which the moving image is divided in accordance with contents, the feedback control unit 34 performs feedback control to drive the drive unit 23 with vibration B having an amplitude larger than that of vibration A. Accordingly, the touch panel 12 vibrates with vibration A in a case where the playback time of the moving image input during a touch operation by the user to move the slider 54 indicates a one-minute interval, and the touch panel 12 vibrates with vibration B in a case where the playback time indicates a chapter.

The feedback control unit 34 performs feedback control to drive the drive unit 23 with both of vibration A and vibration B in a case where the operation speed of the touch operation by the user is lower than a predetermined threshold speed, as illustrated in FIG. 3B. However, the feedback control unit 34 changes the output of feedback control in a case where the operation speed of the touch operation by the user is equal to or higher than the predetermined threshold speed.

Specifically, as illustrated in FIG. 3C, in a case where the operation speed of the touch operation by the user is equal to or higher than the predetermined threshold speed, the feedback control unit 34 stops feedback control with vibration A indicating the one-minute interval at which the moving image is divided on the basis of the playback time. In addition, in this case, the feedback control unit 34 performs feedback control to drive the drive unit 23 only with vibration B indicating a chapter at which the moving image is divided in accordance with contents.

In this manner, in the electronic device 11, the feedback control unit 34 can change feedback control to vibrate the touch panel 12 on the basis of the operation speed at which a touch position detected by the touch position detection unit 22 moves. Accordingly, the electronic device 11 can avoid dense generation of the vibration and thus difficulties in perception of vibration by the user, thereby providing a more favorable user interface.

Note that a threshold speed at which the feedback control unit 34 changes the output of feedback control may be set at shipment of the electronic device 11 or may be optionally set by the user in accordance with perception of the user. Furthermore, the feedback control unit 34 may set two threshold speeds or more and change three kinds or more of the output of feedback control.

Figure 4A:
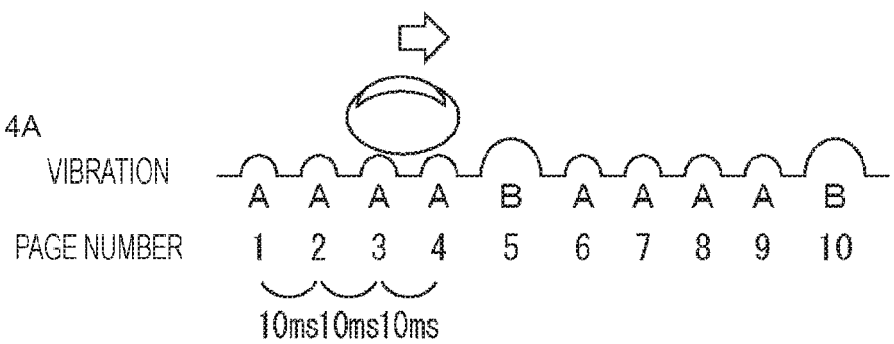
FIGS. 4A and 4B are diagrams for description of a second mode in which the output of feedback control is changed in accordance with the operation speed.
Figure 4B:
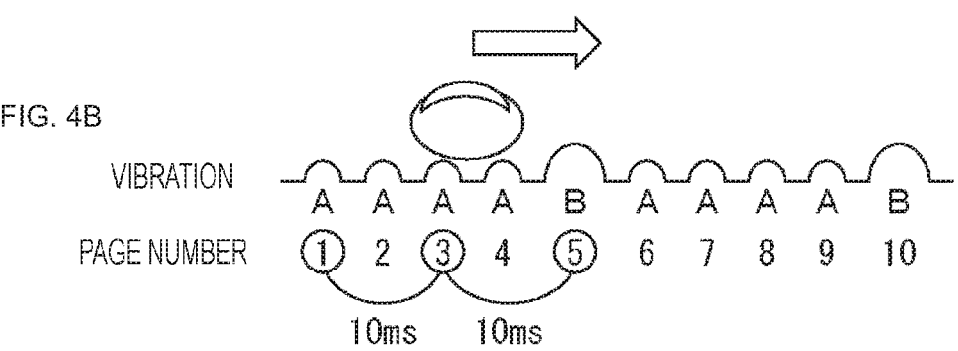

The following describes, with reference to FIGS. 4A and 4B, a second mode in which the output of feedback control is changed in accordance with the speed of an operation by the user.

Similarly to FIGS. 2A and 2B, FIGS. 4A and 4B illustrate exemplary feedback control performed while an electronic book application is executed by the application execution unit 14.

As described above with reference to FIGS. 2A and 2B, the touch panel 12 vibrates with vibration A in a case where the page number of an electronic book input during a touch operation in which the user moves the slider 44 is other than multiples of five, and the touch panel 12 vibrates with vibration B in a case where the page number is a multiple of five.

Then, as illustrated in FIG. 4A, the feedback control unit 34 performs feedback control to drive the drive unit 23 with both of vibration A and vibration B in a case where the interval of vibration in accordance with continuous page numbers is equal to or longer than 10 ms (threshold interval) depending on the operation speed of the touch operation by the user. However, the feedback control unit 34 changes the output of feedback control in a case where the interval of vibration in accordance with continuous page numbers is shorter than 10 ms depending on the operation speed of the touch operation by the user.

Specifically, it is difficult for the user to sense individual vibration A and vibration B when all feedback controls are performed as they are in a case where an interval at which page numbers are continuously acquired by the input information acquisition unit 32 is shorter than 10 ms depending on the operation speed of the touch operation by the user. Thus, in this case, the feedback control unit 34 changes the output of feedback control so that the interval of vibration output in accordance with continuous page numbers is not shorter than 10 ms. Specifically, as illustrated in FIG. 4B, the feedback control unit 34 thins the output of feedback control and performs feedback control to generate vibration at every other page number.

For example, the feedback control unit 34 measures an elapsed time from a timing at which feedback control is performed on the drive unit 23 to vibrate, and then when performing feedback control on the drive unit 23, determines whether or not the elapsed time is shorter than 10 ms. In addition, in a case where the elapsed time is not shorter than 10 ms, the feedback control unit 34 performs feedback control on the drive unit 23 to vibrate. In a case where the elapsed time is shorter than 10 ms, the feedback control unit 34 stops feedback control (output of any one of vibration A and vibration B) on the drive unit 23.

In this manner, in the electronic device 11, the feedback control unit 34 can change an interval at which feedback control is output so that an interval at which the touch panel 12 vibrates is equal to or longer than a threshold interval (for example, 10 ms) beyond which the user cannot perceive continuous vibration. Accordingly, the electronic device 11 reliably allows the user to perceive individual vibration, thereby providing a more favorable user interface.

Note that the threshold interval at which the feedback control unit 34 changes the output of feedback control may be set at shipment of the electronic device 11 or may be optionally set by the user in accordance with perception of the user.

<Signal Processing on Touch Operation>

Figure 5:
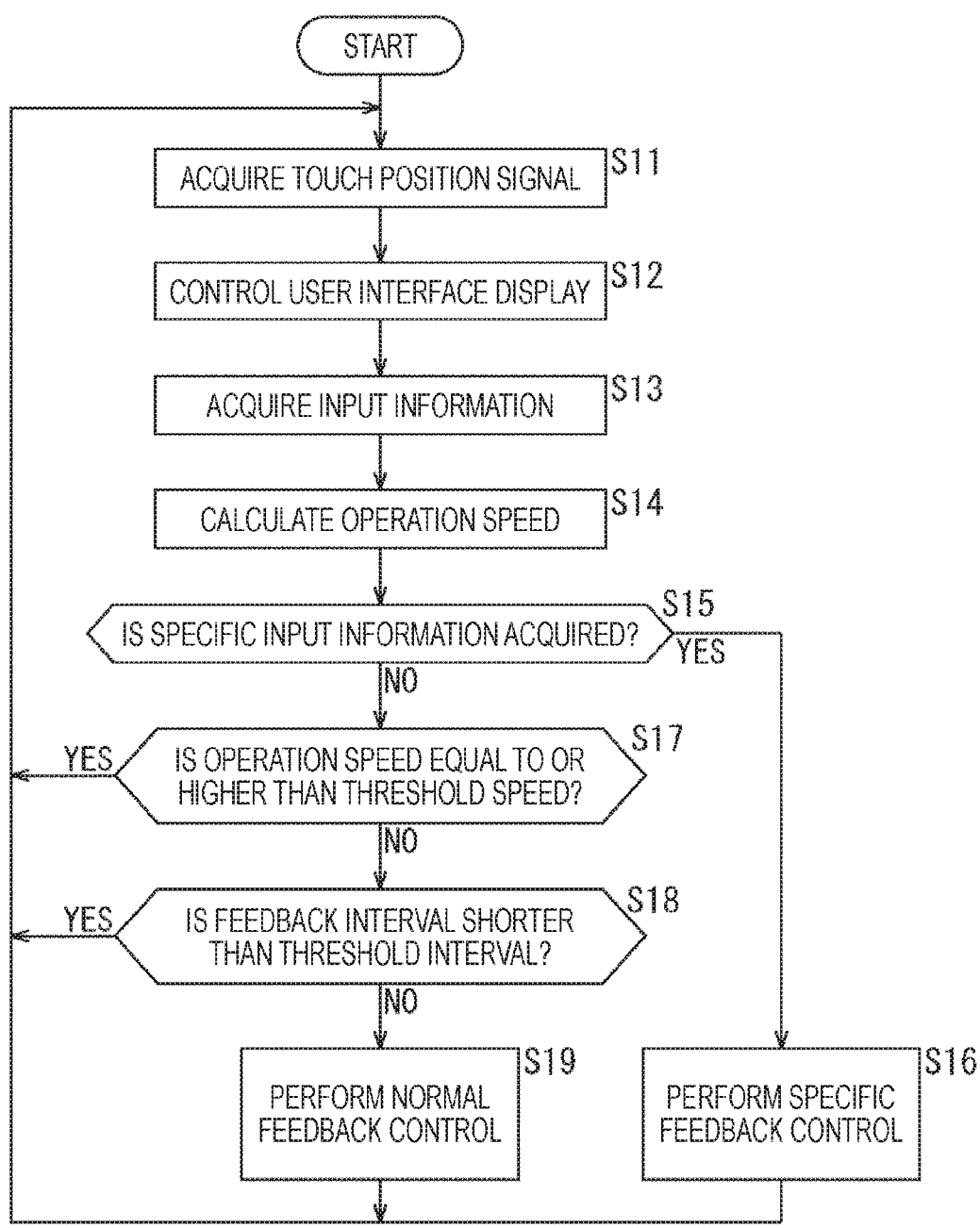
FIG. 5 is a flowchart for description of signal processing executed by a touch signal processing unit.

The following describes signal processing executed by the touch signal processing unit 13 with reference to a flowchart illustrated in FIG. 5.

The processing is started, for example, when the user touches the touch panel 12 and a touch position signal indicating the position of the touch is supplied from the touch position detection unit 22 to the touch signal processing unit 13. At step S11, the user interface display control unit 31, the input information acquisition unit 32, and the operation speed calculation unit 33 acquire the touch position signal supplied from the touch position detection unit 22.

At step S12, the user interface display control unit 31 controls display of a user interface to, for example, moves the display position of the slider 44 in FIGS. 2A and 2B, on the basis of the touch position signal acquired at step S11.

At step S13, the input information acquisition unit 32 acquires input information input through the touch operation by the user on the basis of the touch position signal acquired at step S11, and supplies the input information to the feedback control unit 34 and the application execution unit 14. For example, the input information acquisition unit 32 acquires the page number of an electronic book as described above with reference to FIGS. 2A and 2B and supplies the page number to the application execution unit 14, and the application execution unit 14 displays a page with the page number on the display screen 41 of the electronic book.

At step S14, the operation speed calculation unit 33 calculates the operation speed of the touch operation by the user on the basis of the touch position signal acquired at step S11, and supplies the operation speed to the feedback control unit 34.

At step S15, the feedback control unit 34 determines whether or not specific input information is acquired by the input information acquisition unit 32 at step S13.

At step S15, in a case where the feedback control unit 34 determines that specific input information is acquired by the input information acquisition unit 32, the processing proceeds to step S16. At step S16, the feedback control unit 34 performs specific feedback control on the drive unit 23. For example, as described above with reference to FIGS. 2A and 2B, in a case where the page number of the electronic book acquired by the input information acquisition unit 32 is a multiple of five, the feedback control unit 34 performs feedback control on the drive unit 23 to drive the touch panel 12 with vibration B.

On the other hand, at step S15, in a case where the feedback control unit 34 determines that specific input information is not acquired by the input information acquisition unit 32, the processing proceeds to step S17. Specifically, in this case, the feedback control unit 34 determines that normal input information is acquired by the input information acquisition unit 32.

At step S17, the feedback control unit 34 determines whether or not the operation speed calculated by the operation speed calculation unit 33 at step S14 is equal to or higher than the predetermined threshold speed.

At step S17, in a case where the feedback control unit 34 determines that the operation speed is equal to or higher than the predetermined threshold speed, the processing returns to step S11 and repeats similar processing. Specifically, in this case, normal feedback control is not performed, and, for example, feedback control with vibration A indicating the one-minute interval at which the moving image is divided on the basis of the playback time is stopped as described above with reference to FIGS. 3A 3B, and 3C.

On the other hand, at step S17, in a case where the feedback control unit 34 determines that the operation speed is not equal to or higher than the predetermined threshold speed, the processing proceeds to step S18. Specifically, in this case, the feedback control unit 34 determines that the operation speed is lower than the predetermined threshold speed.

At step S18, the feedback control unit 34 determines whether or not a feedback interval as an interval at a timing when the input information is acquired by the input information acquisition unit 32 is shorter than a predetermined threshold interval.

At step S18, in a case where the feedback control unit 34 determines that the feedback interval is shorter than the predetermined threshold interval, the processing returns to step S11 and repeats similar processing. Specifically, in this case, the normal feedback control is not performed, and for example, the output of feedback control is thinned so that the interval of vibration is not shorter than 10 ms as described above with reference to FIGS. 4A and 4B.

On the other hand, at step S18, in a case where the feedback control unit 34 determines the feedback interval is not shorter than the predetermined threshold interval, the processing proceeds to step S19. Specifically, in this case, the feedback control unit 34 determines that the feedback interval is equal to or longer than the predetermined threshold interval.

At step S19, the feedback control unit 34 performs the normal feedback control on the drive unit 23. For example, as described above with reference to FIGS. 2A and 2B, in a case where the page number of the electronic book acquired by the input information acquisition unit 32 is not a multiple of five, the feedback control unit 34 performs feedback control on the drive unit 23 to drive the touch panel 12 with vibration A.

After the feedback control is performed at step S16 or S19, the processing returns to step S11 and repeatedly performs similar processing on the next touch position signal.

As described above, the touch signal processing unit 13 can output the specific feedback control (for example, vibration B) in a case of specific input information, and output the normal feedback control (for example, vibration A) in a case of normal input information. In this manner, the mutually different kinds of feedback control are output in accordance with the kind of input information so that the user can perceive difference in feedback control when performing a touch operation to move a touched position, and easily recognize a target position (for example, a page number).

Furthermore, the touch signal processing unit 13 can stop the output of the normal feedback control in a case where the operation speed of the touch operation by the user is equal to or higher than the predetermined threshold speed, or in a case where the feedback interval is shorter than the predetermined threshold interval. Accordingly, for example, this can prevent the user from suffering difficulties in sensing individual vibration due to continuous generation of vibration.

Note that the processing at steps S17 and S18 illustrated in FIG. 5 may be executed in the opposite order. Furthermore, any one of the processing at steps S17 and S18 illustrated in FIG. 5 may be selectively performed, for example, in accordance with the kind of a user interface provided on the electronic device 11. Specifically, only the processing at step S17 may be performed when a moving image playback application (FIGS. 3A, 3B, and 3C) is executed, and only the processing at step S18 may be performed when an electronic book application (FIGS. 4A and 4B) is executed.

<Modification of Feedback Control>

In a case where feedback control is performed so that the interval of continuously generated vibration is equal to or longer than 10 ms as described above with reference to FIGS. 4A and 4B, vibration B is thinned in some cases depending on the operation speed of a touch operation.

Figure 6A:
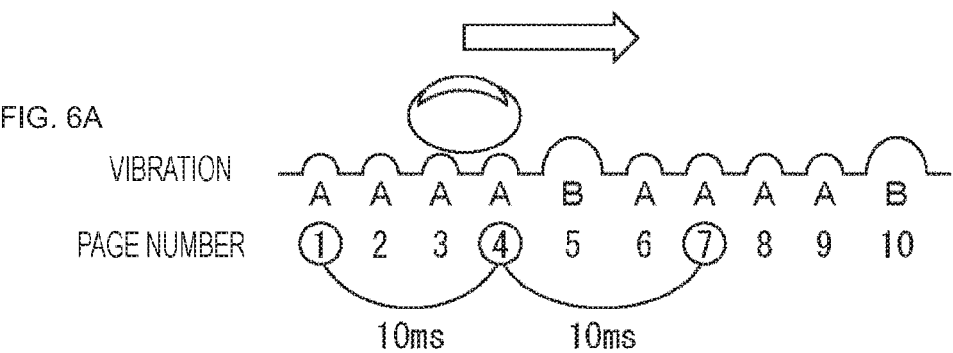
FIGS. 6A, 6B, and 6C are diagrams for description of a modification of the feedback control.

Specifically, as illustrated in A of FIG. 6A, in a case where the interval of page numbers with which the interval of vibration is equal to or longer than 10 ms depending on the operation speed of a touch operation by the user is four pages, vibration A for the first page is followed by vibration A for the fourth page and then vibration A for the seventh page. In other words, vibration B for the fifth page is thinned in this case. Accordingly, it is impossible to achieve an object to improve operability by using two kinds of vibration, vibration A and vibration B.

To avoid this, the feedback control unit 34 can perform feedback control to preferentially generate vibration B in accordance with a page number at a multiple of five.

Since vibration A and vibration B are of different kinds, it is thought that the vibrations can be perceived by the user, for example, even in a case where the interval therebetween is shorter than 10 ms.

Figure 6B:
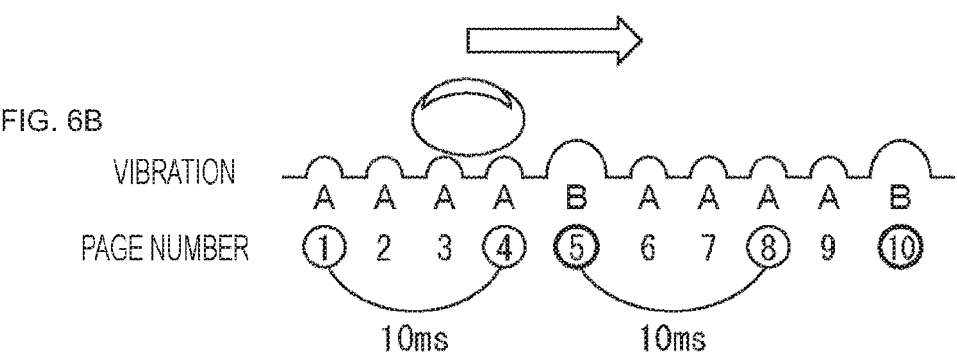

Thus, as illustrated in FIG. 6B, even in a case where the interval of continuous vibrations is shorter than 10 ms, the feedback control unit 34 performs feedback control on the drive unit 23 to drive the touch panel 12 with vibration B if the kinds of vibrations are different from each other. Specifically, the feedback control unit 34 performs feedback control to drive vibration A in a case where the interval from vibration A or vibration B right before is equal to or longer than 10 ms and drive vibration B in any case.

Furthermore, for example, even in a case where the interval between vibration A and vibration B is shorter than 10 ms and thus the vibrations can be perceived by the user, vibration B can be set to be significant to achieve a more favorable user interface.

Figure 6C:
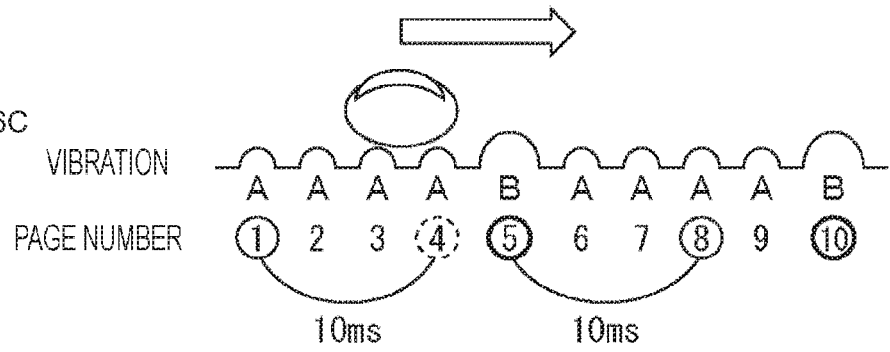

Thus, as illustrated in FIG. 6C, in a case where the interval until vibration B is generated after vibration A is driven at a certain timing is shorter than 10 ms, the feedback control unit 34 performs feedback control to stop drive of vibration A at the timing. Specifically, the feedback control unit 34 can perform feedback control to stop generation of vibration A so that the interval of continuously generated vibration A and vibration B is equal to or longer than 10 ms and vibration B is preferentially generated.

As described above, the feedback control unit 34 can perform feedback control so that vibration B is always output or preferentially output. Accordingly, the electronic device 11 can provide a user interface having excellent operability by using two kinds of vibration A and vibration B.

<Input of Specific Input Information>

In a case where a touch operation on the seek bar 42 is performed as illustrated in FIGS. 2A and 2B, the user perceives vibration A and vibration B while moving a touched position, and cancels touch when vibration is generated in accordance with a desired page number, thereby inputting the current page number. In this case, for example, even in a case where the user cancels touch right after having perceived vibration B while moving the touched position when the user intends to input a specific page number, the following page number is potentially input due to the time lag between the perception of the vibration and the touch cancellation.

Figure 7A:
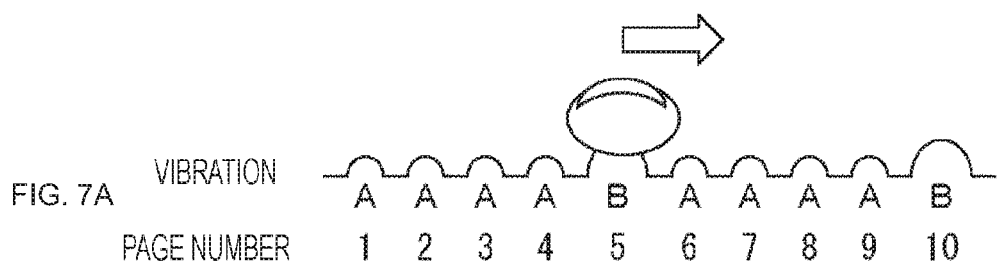
FIGS. 7A, 7B, and 7C are diagrams for description of a drag range for inputting specific input information.
Figure 7B:
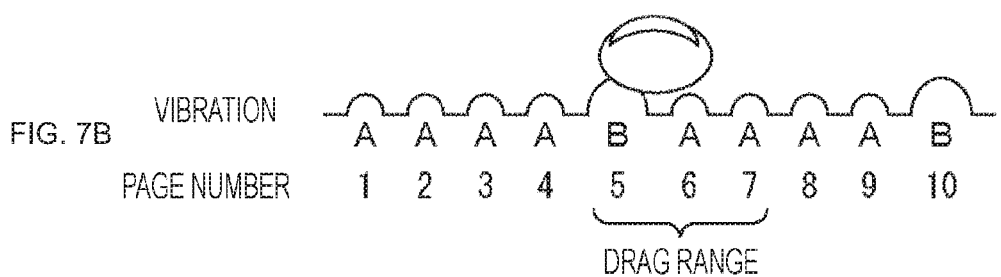
Figure 7C:
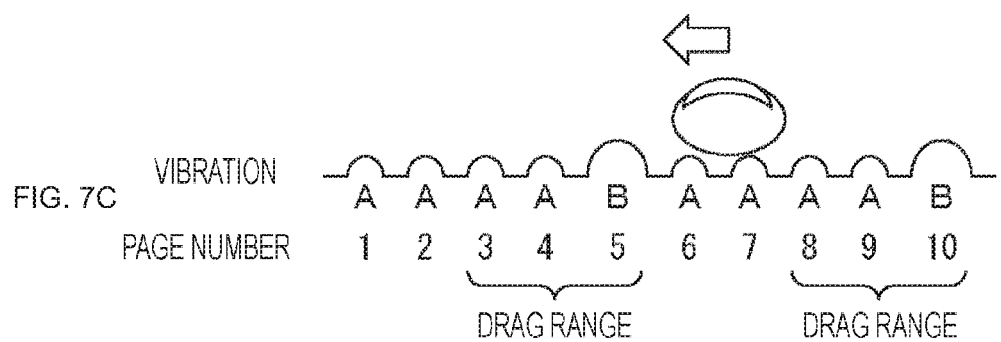

To avoid this, as illustrated in FIGS. 7A, 7B, and 7C, when touch is canceled in a predetermined drag range from a specific page number, the input information acquisition unit 32 can determine that the specific page number is input as a page number supplied to the application execution unit 14.

For example, in a case where a touch operation moving from the left side to the right side is performed as illustrated in FIG. 7A, the input information acquisition unit 32 sets the drag range to be two pages on the right side of the specific page number. Then, when touch is canceled in the drag range (in the example illustrated in FIG. 7B, the sixth and seventh pages), the input information acquisition unit 32 supplies the specific page number (in the example illustrated in FIG. 7B, the fifth page) corresponding to the drag range to the application execution unit 14 as input information.

In this manner, when the input information acquisition unit 32 sets the drag range for a specific page number, the user can input the specific page number irrespective of the time lag between perception of vibration B while a touched position is moved and cancellation of touch.

Furthermore, in a case where the drag range is set in this manner, a page number in the drag range can be input by performing a touch operation moving from the right side to the left side as illustrated in FIG. 7C. Specifically, in a case where a touch operation moving from the right side to the left side is performed, the input information acquisition unit 32 sets the drag range to be two pages on the left side of a specific page number. Accordingly, a page number on the right side of the specific page number, which cannot be input when a touch operation moving from the left side to the right side is performed, can be input through the touch operation moving from the right side to the left side.

In this manner, the input information acquisition unit 32 sets the drag range on any one of the right and left sides of a specific page number in accordance with the moving direction of a touch operation so that the user can input a page number on a side where the drag range is not set.

As described above, when the input information acquisition unit 32 sets the drag range for specific input information, the user can easily input the specific input information, and can also input normal input information near the specific input information.

Note that the width (in the example illustrated in FIGS. 7A, 7B, and 7C, two pages) of the drag range set by the input information acquisition unit 32 may be set at shipment of the electronic device 11 or may be optionally set by the user in a range not larger than the interval of specific page numbers.

<Auxiliary User Interface>

The following describes, with reference to FIGS. 8A, 8B, 8C, 9A, and 9B, an auxiliary user interface that displays, upon round-trip movement of a touch operation, a certain range in an enlarged manner so that input information can be finely input.

For example, in a case where the number of paces represented by a bar 63 is large or the playback time is long when a touch operation is performed on a seek bar 62 displayed on a display screen 61, it is difficult to input a desired page number or playback time by moving a slider 64. Specifically, in this case, a minute touch operation on the slider 64 is requested, and thus it is extremely difficult to cancel touch at a desired position. Specifically, in a case where the bar 63 is equally divided into 1000 parts, "140" is potentially input when the user moves the slider 64 to input "123".

Figure 8A:
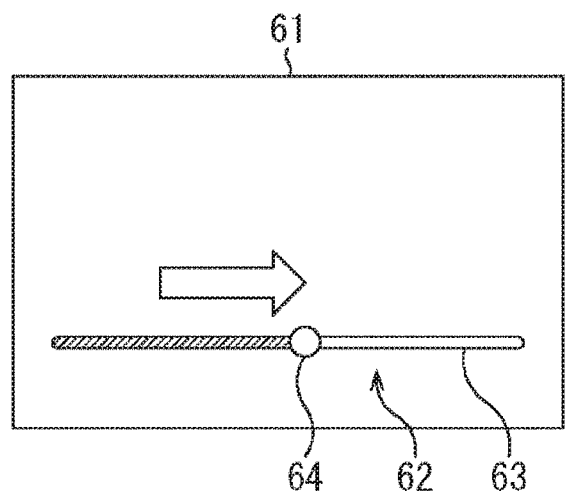
FIGS. 8A, 8B, and 8C are diagrams for description of an auxiliary user interface on which a certain range is displayed in an enlarged manner.
Figure 8B:
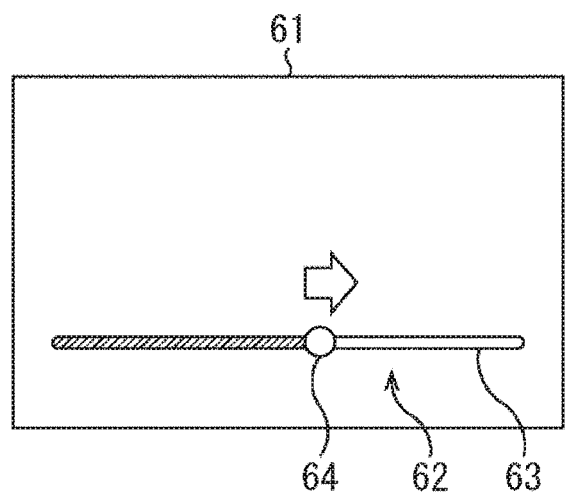
Figure 8C:
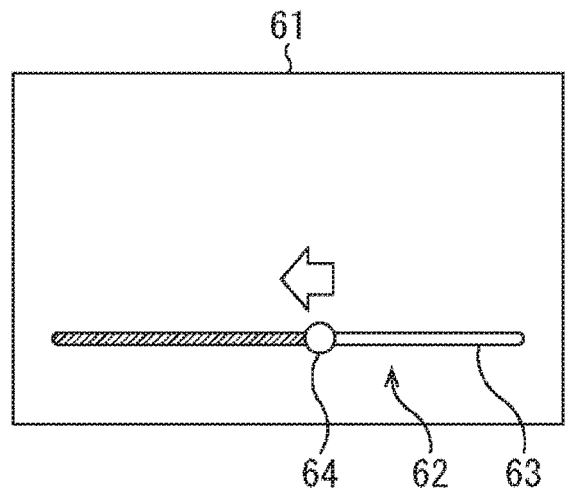

In this manner, in a case where a minute touch operation is performed on the slider 64, first, a touch operation at a fast operation speed is performed to move the slider 64 to the vicinity of a desired position at once as illustrated in A of FIG. 8A. Thereafter, as illustrated in FIGS. 8B and 8C, a touch operation is performed to move the slider 64 to right and left in a certain narrow range including the desired position at a slow operation speed equal to or lower than a predetermined operation speed.

Then, in a case where performing of a touch operation that moves at a slow operation speed to the right and left in a certain range is detected in accordance with a touch position signal supplied from the touch position detection unit 22, the user interface display control unit 31 displays an auxiliary user interface on which the certain range is displayed in an enlarged manner.

Figure 9A:
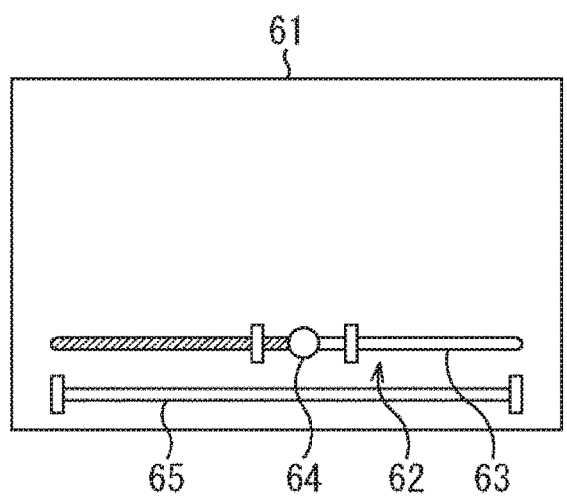
FIGS. 9A and 9B are diagrams for description of an auxiliary user interface on which a certain range is displayed in an enlarged manner.

For example, as illustrated in FIG. 9A, the user interface display control unit 31 may display, below the seek bar 62 in parallel to the seek bar 62, an enlarged user interface 65 on which the range in which a touch operation that moves to the right and left at a slow operation speed is performed is displayed in an enlarged manner. For example, the user interface display control unit 31 may display the enlarged user interface 65 dilute or dense in accordance with the touch operation by the user.

Figure 9B:
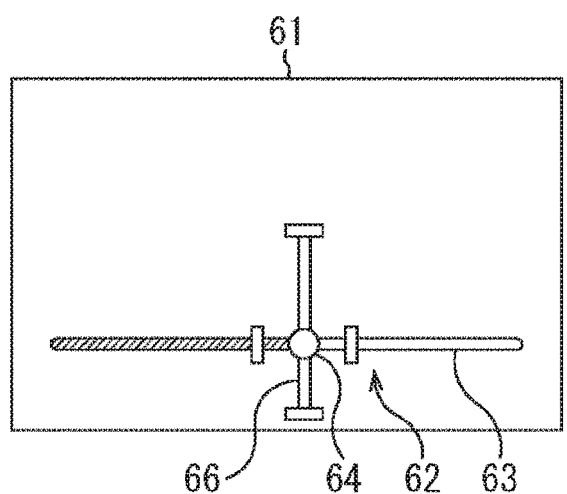

Furthermore, for example, as illustrated in FIG. 9B, the user interface display control unit 31 may display, orthogonal to the seek bar 62, an enlarged user interface 66 on which the range in which a touch operation that moves to the right and left at a slow operation speed is performed is displayed in an enlarged manner.

In this manner, when the user interface display control unit 31 displays the enlarged user interface 65 or 66, the user can finely input input information by performing a touch operation on the enlarged user interface 65 or 66. Specifically, the auxiliary enlarged user interface 65 or 66 on which the range in which a touch operation that moves to the right and left at a slow operation speed is performed is displayed in an enlarged manner is used, so that the user can easily input desired input information in the range.

Note that, when the user performs a touch operation on the enlarged user interface 65 or 66, the feedback control unit 34 may perform feedback control to drive the drive unit 23 with vibration A and vibration B, similarly to feedback to the seek bar 62. Furthermore, in a case where the operation speed is increased after a touch operation that moves to the right and left at a slow operation speed is performed, the enlarged user interface 65 or 66 is not displayed. Furthermore, in a case where a position separated from the certain range is touched or the touch is largely moved to one side, the enlarged user interface 65 or 66 is not displayed.

In addition, in a case where the range in which a touch operation that moves to the right and left at a slow operation speed is performed is narrowed, the range to be enlarged by the enlarged user interface 65 or 66 is adjusted. Furthermore, the range to be enlarged may be narrowed in a case where the operation speed is slow, or the range to be enlarged may be widened in a case where the operation speed is fast. Alternatively, the range to be enlarged may be narrowed in accordance with the number of times of movement to the right and left.

<Feedback Control in Response to Swipe>

The following describes feedback control in response to a swipe with reference to FIGS. 10A, 10B, 10C, 11A, and 11B.

The electronic device 11 can handle not only the above-described touch operation on a seek bar but also a touch operation (what is called a swipe) to scroll the entire display screen displayed on the display unit 21.

Figure 10A:
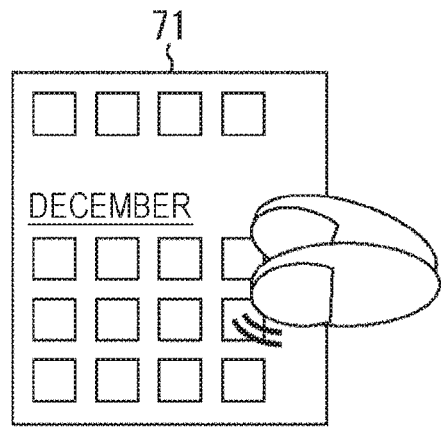
FIGS. 10A, 10B, and 10C are diagrams for description of exemplary feedback control in response to a swipe.
Figure 10B:
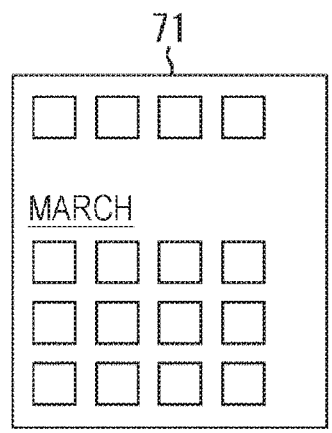
Figure 10C:
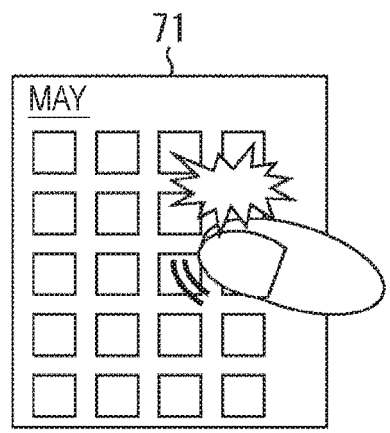

FIGS. 10A, 10B, and 10C illustrate an exemplary display screen 71 displayed on the display unit 21 when a picture management application is executed by the application execution unit 14. For example, in the picture management application, a plurality of pictures (contents) are classified in accordance with a month in which each picture is captured, and displayed on the display screen 71 in the order of a day on which the picture is captured.

As illustrated in A of FIG. 10A, the user can perform a touch operation that vertically moves while a finger touches the display screen 71, and for example, when a touch operation that moves the finger downward is performed, the display is scrolled and a picture captured on an old date is displayed. In this case, if a touch operation that moves fast to find a desired picture from among a large number of pictures is performed, the display is potentially scrolled beyond a desired date. For example, as illustrated in A of FIG. 10A, if a touch operation that moves fast is performed to find a picture captured in May while a picture captured in December is displayed, the display is potentially scrolled to a picture captured in March as illustrated in FIG. 10B.

To avoid this, the input information acquisition unit 32 acquires, as the input information, a boundary at each row of pictures or the boundary of switching a month in which a picture is captured (specific partition). Then, the feedback control unit 34 performs, for example, feedback control on the drive unit 23 to drive the touch panel 12 with vibration A when each row of pictures passes through the upper end or lower end of the display screen 71. In addition, the feedback control unit 34 may perform, for example, feedback control on the drive unit 23 to drive the touch panel 12 with vibration B when the boundary of switching a month in which a picture is captured passes through the upper end or lower end of the display screen 71.

Thus, the user can recognize, through perception of vibration B, the boundary at which months are switched, and can perform a touch operation to stop scroll when a month in which a desired picture is captured is displayed as illustrated in C of FIG. 10C. Accordingly, the electronic device 11 provides a user interface that allows a desired picture to be easily found from among a large number of pictures.

Note that, in a case where the display screen is scrolled fast, for example, a touch operation that moves a touching finger fast and then separates the finger is performed. In this case, vibration cannot be perceived by the finger, but, for example, such a large vibration that drive by the drive unit 23 is transferred to the entire electronic device 11 can be generated to allow the user to perceive vibration A and vibration B through the hand holding the electronic device 11.

Furthermore, the electronic device 11 may use not only, for example, the above-described two kinds of vibration, vibration A and vibration B, but also a large number of other kinds of vibration.

Figure 11A:
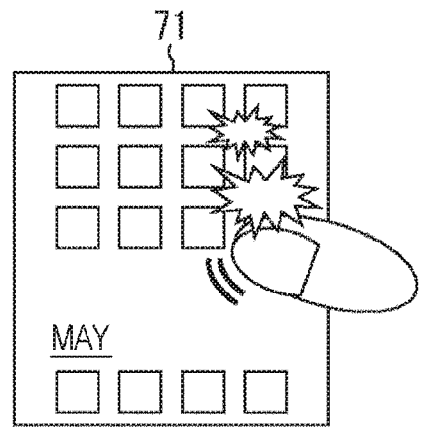
FIGS. 11A and 11B are diagrams for description of a modification of feedback control in response to a swipe.

For example, as illustrated in FIG. 11A, the feedback control unit 34 may perform feedback control to generate vibration having an amplitude or frequency that increases as a specific boundary moves closer. In addition, the feedback control unit 34 may perform feedback control to generate vibration having an amplitude or frequency that decreases as a specific boundary moves away.

Furthermore, the feedback control unit 34 may perform feedback control with vibration B not only at the boundary of switching of the month of a date on which a picture is captured, but also, for example, at the boundary of switching of the week of a date on which the picture is captured, the boundary of change of a place at which the picture is captured or the like. In this manner, the user may optionally set a boundary at which feedback control with vibration B is performed.

Furthermore, the feedback control unit 34 may perform feedback control with vibration B at each month in a case where the operation speed calculated by the operation speed calculation unit 33 is equal to or higher than a threshold speed, or may perform feedback control with vibration B at each week in a case where the operation speed is lower than the threshold speed.

Figure 11B:
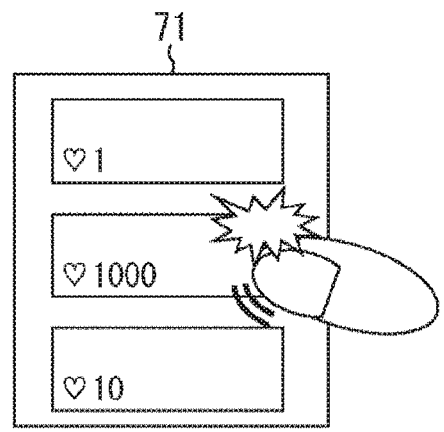

Furthermore, as illustrated in FIG. 11B, for example, in a case where a social network application is executed by the application execution unit 14, a plurality of comments are displayed on the display screen 71 in the order of date on which each comment is transmitted through a social network. In addition, the feedback control unit 34 may perform feedback control with vibration A for each individual comment or perform feedback control with vibration B for each popular comment.

In this manner, the electronic device 11 can execute various applications through the application execution unit 14, and the feedback control unit 34 can perform feedback control suitable for each application. For example, the present invention is applicable to a user interface used to change a volume at which music is output or select the title of music as a playback target in a music playback application.

Note that the above description is made on feedback control with the two kinds of vibration A and vibration B, but, for example, the electronic device 11 may perform feedback control with three kinds or more of vibrations. Furthermore, the vibrations may differ from each other by differentiating the amplitude or frequency. In addition, the pattern of each vibration may be produced or edited by the user and registered to the electronic device 11.

For example, in a case where an electronic book application is executed by the application execution unit 14, feedback control may be performed to generate vibration different from normal vibration at each partition such as a section or a chapter in addition to normal and specific page numbers. Furthermore, feedback control may be performed to generate vibration different from normal vibration at a page on which a bookmark is set by the user.

Figure 12:
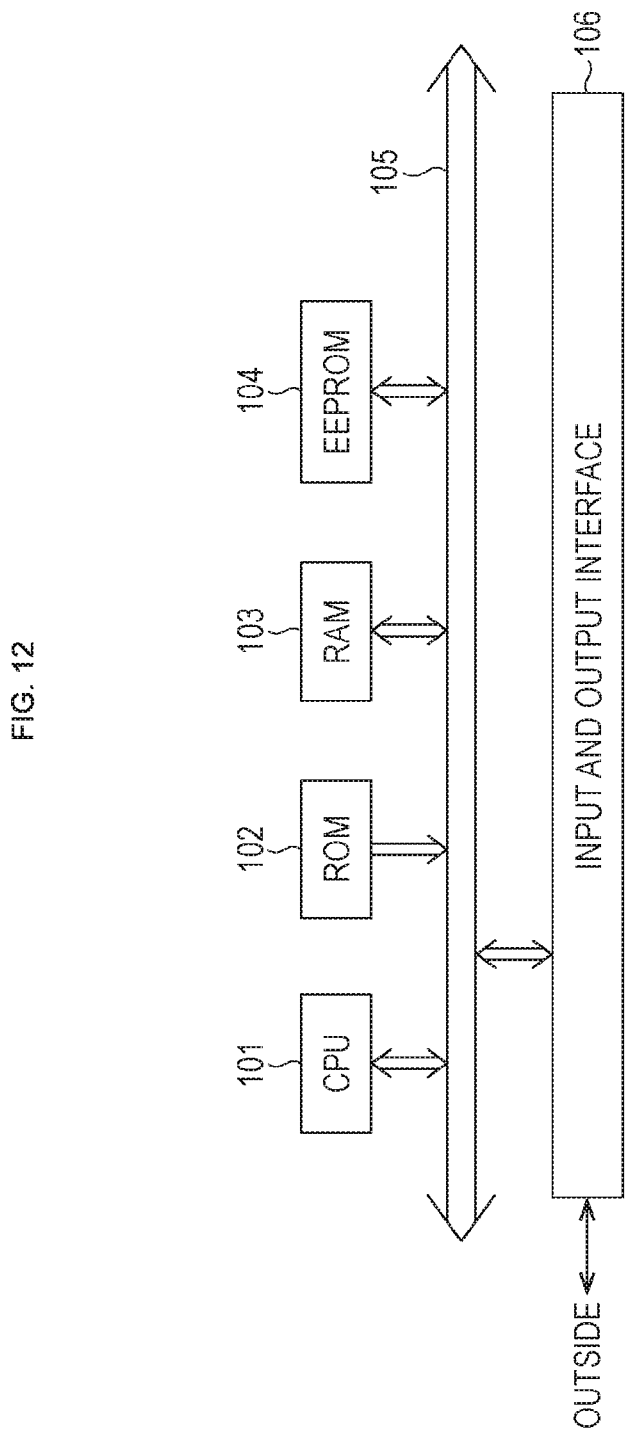
FIG. 12 is a block diagram illustrating an exemplary configuration of an embodiment of a computer to which the present technology is applied.

FIG. 12 is a block diagram illustrating an exemplary hardware configuration of a computer that executes the above-described series of processing on the basis of a program.

In the computer, a central processing unit (CPU) 101, a read only memory (ROM) 102, a random access memory (RAM) 103, and an electronically erasable and programmable read only memory (EEPROM) 104 are connected with each other through a bus 105. The bus 105 is also connected with an input and output interface 106, and the input and output interface 106 is connected with outside (for example, the touch panel 12 illustrated in FIG. 1).

In the computer configured as described above, the CPU 101 loads, for example, programs stored in the ROM 102 and the EEPROM 104 onto the RAM 103 through the bus 105 and executes the programs, thereby performing the above-described series of processing. Furthermore, each program executed by the computer (CPU 101) may be written in the ROM 102 in advance, installed on the EEPROM 104 from the outside through the input and output interface 105, or updated.

Note that the present technology may be configured as described below.

(1) A signal processing device including:

an input information acquisition unit configured to acquire input information input through a touch operation by the user; and a feedback control unit configured to output mutually different kinds of feedback control in accordance with a kind of the input information continuously acquired in response to movement of a position touched through the touch operation.

(2) The signal processing device according to (1), further including an operation speed calculation unit configured to calculate an operation speed at which the position touched through the touch operation moves, in which the feedback control unit changes output of the feedback control in accordance with the operation speed calculated by the operation speed calculation unit.

(3) The signal processing device according to (1) or (2), in which the feedback control unit outputs first feedback control in a case where the kind of the input information is a first kind, and outputs second feedback control that is more likely to be perceived than the first feedback control in a case where the kind of the input information is a second kind that is input at a frequency lower than a frequency of the first kind.

(4) The signal processing device according to (3), in which, in a case where the operation speed calculated by the operation speed calculation unit is equal to or higher than a predetermined threshold speed, the feedback control unit performs a change to stop outputting of the first feedback control so that only the second feedback control is output.

(5) The signal processing device according to (3) or (4), in which, in a case where an interval at which the input information is continuously acquired by the input information acquisition unit is shorter than a predetermined threshold interval, the feedback control unit performs a change to stop outputting of any one of the first feedback control and the second feedback control so that an interval of continuous outputting of the first feedback control and the second feedback control becomes equal to or longer than the predetermined threshold interval.

(6) The signal processing device according to (5), in which the feedback control unit performs feedback control to always output the second feedback control even in a case where the interval at which the input information is continuously acquired by the input information acquisition unit is shorter than a predetermined threshold interval.

(7) The signal processing device according to any one of (3) to (6), in which, in a case where an interval at which the input information is continuously acquired by the input information acquisition unit is shorter than a predetermined threshold interval, the feedback control unit performs a change to stop outputting of the first feedback control so that an interval of continuous outputting of the first feedback control and the second feedback control becomes equal to or longer than a predetermined threshold interval and the second feedback control is preferentially output.

(8) The signal processing device according to any one of (3) to (7), in a case where the touch operation is performed to move a touched position from one direction to another direction, the input information acquisition unit determines that the input information of the second kind is input when touch is canceled in a predetermined range extending toward the other direction from a place at which the input information of the second kind is input.

(9) The signal processing device according to any one of (1) to (8), further including a user interface display control unit configured to control display of a seek bar including a bar indicating a total length of contents and a slider indicating a position corresponding to a predetermined place of the contents, in which the input information acquisition unit acquires, as an input information, the predetermined place of the contents in accordance with a touch operation on the slider.

(10) The signal processing device according to (9), in which, in a case where a touch operation on the slider is a round-trip touch operation in a certain range at an operation speed equal to or slower than a predetermined operation speed, the user interface display control unit displays an auxiliary user interface on which the certain range is displayed in an enlarged manner.

(11) The signal processing device according to any one of (1) to (10), in which in accordance with a touch operation that entirely scrolls a display screen on which a plurality of contents are displayed, the input information acquisition unit acquires, as the input information, a specific partition that classifies each content, and the feedback control unit outputs the feedback control when the specific partition of the contents passes through an end part of the display screen.

(12) A signal processing method including steps of:

acquiring input information input through a touch operation by a user; and outputting mutually different kinds of feedback control in accordance with a kind of the input information continuously acquired in response to movement of a position touched through the touch operation.

(13) A program configured to cause a computer to execute signal processing including steps of:
acquiring input information input through a touch operation by a user; and
outputting mutually different kinds of feedback control in accordance with a kind of the input information continuously acquired in response to movement of a position touched through the touch operation.

(14) An electronic device including:
a touch panel configured to display a user interface for receiving a touch operation by the user, detect a position touched through the touch operation, and vibrate in accordance with signal processing based on the touch operation; and
a signal processing device configured to perform signal processing in accordance with the touch operation on the touch panel by the user,
in which the signal processing device includes an input information acquisition unit configured to acquire input information input through the touch operation, and a feedback control unit configured to output feedback control to the touch panel so that vibrations different from each other are performed in accordance with a kind of the input information continuously acquired in response to movement of a position touched through the touch operation.

Note that the present embodiment is not limited to the above-described embodiments, and various modifications are possible without departing from the scope of the present disclosure.

REFERENCE SIGNS LIST

11 Electronic device
12 Touch panel
13 Touch signal processing unit
14 Application execution unit
21 Display unit
22 Touch position detection unit
23 Display unit
31 User interface display control unit
32 Input information acquisition unit
33 Operation speed calculation unit
34 Feedback control unit

The invention claimed is:
1. A signal processing device, comprising:
a central processing unit (CPU) configured to:
acquire input information, wherein
the input information is input through a user touch operation, and
the input information is acquired based on a movement of a position of the user touch operation on a display screen of the signal processing device;
calculate an operation speed of the user touch operation based on the movement of the position of the user touch operation, wherein the operation speed indicates a speed at which the position of the user touch operation moves from a first position to a second position on the display screen of the signal processing device;
each of a first feedback control and a second feedback control based on the acquired input information in a case where the calculated operation speed is lower than a threshold speed, wherein
the first feedback control is associated with a first output interval based on the movement of the position of the user touch operation, and
the second feedback control is associated with a second output interval longer than the first output interval based on the movement of the position of the user touch operation; and
stop the output of the first feedback control and execute the output of the second feedback control, in a case where the calculated operation speed is equal to or higher than the threshold speed.

2. The signal processing device according to claim 1, wherein
the acquired input information includes first input information and second input information,
in a case where the acquired input information is the first input information, the CPU is further configured to output the first feedback control, and
in a case where the acquired input information is the second input information, the CPU is further configured to output the second feedback control,
the second feedback control has an amplitude higher than an amplitude of the first feedback control, and
the second input information has an occurrence frequency lower than an occurrence frequency of the first input information.

3. The signal processing device according to claim 2, wherein in a case where an interval at which the input information is acquired is shorter than a threshold interval, the CPU is further configured to stop the output of one of the first feedback control or the second feedback control.

4. The signal processing device according to claim 3, wherein, in a case where the interval at which the input information is acquired is shorter than the threshold interval, the CPU is further configured to output the second feedback control.

5. The signal processing device according to claim 2, wherein, in a case where an interval at which the input information is acquired is shorter than a threshold interval, the CPU is further configured to:
stop the output of the first feedback control; and
output the second feedback control.

6. The signal processing device according to claim 2, wherein the CPU is further configured to:
execute the user touch operation to move the position of the user touch operation from a first direction to a second direction; and
determine that the second input information is input in a case where the user touch operation is canceled in a determined range extending toward the second direction from a place at which the second input information is input.

7. The signal processing device according to claim 1, wherein the CPU is further configured to:
control display of a seek bar that includes a bar indicating a total length of content and a slider indicating a position corresponding to a determined place of the content; and
acquire, as the input information, the determined place of the content based on the user touch operation on the slider.

8. The signal processing device according to claim 7, wherein in a case where the user touch operation on the slider is a round-trip touch operation in a specific range at the operation speed equal to or slower than a predetermined operation speed, the CPU is further configured to control display of an auxiliary user interface which includes the specific range in an enlarged manner.

9. The signal processing device according to claim 1, wherein the CPU is further configured to:
   acquire, as the input information, a specific partition that classifies each content, wherein the specific partition is acquired based on a specific user touch operation that entirely scrolls the display screen on which a plurality of contents are displayed; and
   output at least one of the first feedback control or the second feedback control in a case where the specific partition of the plurality of contents passes through an end part of the display screen.

10. A signal processing method, comprising:
   acquiring input information, wherein
      the input information is input through a user touch operation, and
      the input information is acquired based on a movement of a position of the user touch operation on a display screen of a signal processing device;
   calculating an operation speed of the user touch operation based on the movement of the position of the user touch operation, wherein the operation speed indicates a speed at which the position of the user touch operation moves from a first position to a second position on the display screen of the signal processing device;
   outputting each of a first feedback control and a second feedback control based on the input information in a case where the calculated operation speed is lower than a threshold speed, wherein
      the first feedback control is associated with a first output interval based on the movement of the position of the user touch operation, and
      the second feedback control is associated with a second output interval longer than the first output interval based on the movement of the position of the user touch operation; and
   stopping the output of the first feedback control and continuing the output of the second feedback control, in a case where the calculated operation speed is equal to or higher than the threshold speed.

11. A non-transitory computer-readable-medium having stored thereon computer-executable instructions which, when executed by a processor of a signal processing device, cause the processor to execute operations, the operations comprising:
   acquiring input information, wherein
      the input information is input through a user touch operation, and
      the input information is acquired based on a movement of a position of the user touch operation on a display screen of the signal processing device;
   calculating an operation speed of the user touch operation based on the movement of the position of the user touch operation, wherein the operation speed indicates a speed at which the position of the user touch operation moves from a first position to a second position on the display screen of the signal processing device;
   outputting each of a first feedback control and a second feedback control based on the input information in a case where the calculated operation speed is lower than a threshold speed, wherein
      the first feedback control is associated with a first output interval based on the movement of the position of the user touch operation, and
      the second feedback control is associated with a second output interval longer than the first output interval based on the movement of the position of the user touch operation; and
   stopping the output of the first feedback control and continuing the output of the second feedback control, in a case where the calculated operation speed is equal to or higher than the threshold speed.

12. An electronic device, comprising:
   a touch panel configured to:
      display a user interface for reception of a user touch operation;
      detect a position of the user touch operation; and
      vibrate based on the user touch operation; and
   a signal processing device configured to execute a signal process based on the user touch operation on the touch panel, wherein the signal processing device includes a central processing unit (CPU) configured to:
      acquire input information, wherein
         the input information is input through the user touch operation, and
         the input information is acquired based on a movement of the position of the user touch operation;
      calculate an operation speed of the user touch operation based on the movement of the position of the user touch operation, wherein the operation speed indicates a speed at which the position of the user touch operation moves from a first position to a second position on the touch panel;
      output each of a first feedback control and a second feedback control based on the input information in a case where the calculated operation speed is lower than a threshold speed, wherein
         the first feedback control is associated with a first output interval based on the movement of the position of the user touch operation, and
         the second feedback control is associated with a second output interval longer than the first output interval based on the movement of the position of the user touch operation; and
      stop the output of the first feedback control and execute the output of the second feedback control, in a case where the calculated operation speed is equal to or higher than the threshold speed.

* * * * *